United States Patent
Mabu

(10) Patent No.: US 9,520,218 B2
(45) Date of Patent: Dec. 13, 2016

(54) METHOD OF RESIN-SEALING LAMINATED CORE

(71) Applicant: Mitsui High-tec, Inc., Kitakyushu-shi, Fukuoka (JP)

(72) Inventor: Hirotoshi Mabu, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 198 days.

(21) Appl. No.: 14/059,543

(22) Filed: Oct. 22, 2013

(65) Prior Publication Data

US 2014/0124978 A1    May 8, 2014

(30) Foreign Application Priority Data

Nov. 2, 2012 (JP) .................................. 2012-242851

(51) Int. Cl.
| | | |
|---|---|---|
| *H01F 41/02* | (2006.01) | |
| *H01F 7/02* | (2006.01) | |
| *H02K 15/03* | (2006.01) | |
| *H02K 1/27* | (2006.01) | |

(52) U.S. Cl.
CPC ............ *H01F 7/0221* (2013.01); *H02K 15/03* (2013.01); *H02K 1/276* (2013.01); *H02K 2201/09* (2013.01)

(58) Field of Classification Search
CPC ... H02K 2201/09; H02K 15/03; H01F 7/0221; H01F 41/0246
USPC ....................................................... 264/261
See application file for complete search history.

(56) References Cited

U.S. PATENT DOCUMENTS

| | | | |
|---|---|---|---|
| 2003/0193258 A1* | 10/2003 | Reiter et al. ................... | 310/216 |
| 2008/0309015 A1* | 12/2008 | Ogata ..................... | B29C 45/02 |
| | | | 277/316 |
| 2009/0174273 A1* | 7/2009 | Watanabe .............. | H02K 15/03 |
| | | | 310/156.53 |
| 2009/0189309 A1* | 7/2009 | Matsubayashi et al. ..... | 264/263 |

(Continued)

FOREIGN PATENT DOCUMENTS

| | | |
|---|---|---|
| CN | 101657950 A | 2/2010 |
| JP | 2006-204068 A | 8/2006 |

(Continued)

OTHER PUBLICATIONS

Notification of Reasons for Refusal by SIPO dated Sep. 11, 2015, issued in counterpart Chinese Patent Application No. 201310533741.1, with machine translation (14 pages).

*Primary Examiner* — Alison L Hindenlang
*Assistant Examiner* — Mohamed K Ahmed Ali
(74) *Attorney, Agent, or Firm* — Westerman, Hattori, Daniels & Adrian, LLP

(57) ABSTRACT

A method of resin-sealing for a laminated core includes the steps of: holding by sandwiching a core body 11 between a resin injection mold 20 and a supporting mold 21; extruding a molten resin using a plunger 37 from a resin reservoir pot 24 provided in the resin injection mold 20; and resin-sealing the permanent magnets 18 in the magnet insertion holes 16 and 17, wherein a material of the resin reservoir pot 24 of the resin injection mold 20 and a region through which the resin passes from the resin reservoir pot 24 is a superhard material, and wear in the resin injection mold 20 due to a flow of the resin is reduced. With this, a gap between the resin reservoir pot 24 and the resin injection mold 20 due to a difference in thermal expansion is less easily produced.

5 Claims, 8 Drawing Sheets

(56) References Cited

U.S. PATENT DOCUMENTS

2010/0026127 A1     2/2010   Mizutani et al.
2012/0177772 A1*    7/2012   Judd .................... B29C 33/565
                                                                        425/542

FOREIGN PATENT DOCUMENTS

| JP | 2008-054376 A | 3/2008 |
| JP | 200854367 A | 3/2008 |
| JP | 2010011549 A | 1/2010 |
| JP | 2011067053 A | 3/2011 |

\* cited by examiner

PRIOR ART

METHOD OF RESIN-SEALING LAMINATED CORE

TECHNICAL FIELD

The present invention relates to a method of resin-sealing a permanent magnet in a magnet insertion hole of a core body formed by caulking and laminating a plurality of core sheets (including a laminated rotor core or a laminated stator core when provided as a product).

BACKGROUND ART

As described in Patent Document 1, there has been a method including placing a laminated core having core sheets caulked and laminated between a resin injection mold (an upper die or a lower die) and a supporting mold (a lower die or an upper die) (also referred to as a core body), discharging a resin by a plunger from a resin reservoir pot of the resin injection mold, and resin-sealing permanent magnets (including one that is not magnetized; the same applies in the following) placed in magnet insertion holes of the laminated core.

Further, as described in Patent Document 2, there is also a method including placing a middle plate (also referred to as a dummy plate or a cull plate) between a laminated core and a resin injection mold, and injecting a resin into a magnet insertion hole of the laminated core through a runner from a resin reservoir pot of the resin injection mold.

PRIOR ART DOCUMENTS

Patent Documents

[Patent Document 1]
JP 2006-204068 A
[Patent Document 2]
JP 2008-54376 A

SUMMARY OF THE INVENTION

Problems to be Solved by the Invention

In the methods of resin-sealing for a laminated core described in Patent Documents 1 and 2, the resin injection mold is typically made of steel, and therefore wear is produced between the resin reservoir pot and the plunger if the resin includes a filler. Therefore, as illustrated in FIGS. 8(A) and 8(B), there has been a configuration in which a tubular material 80 forming a tubular resin reservoir pot 79 and a plunger 81 moving up and down are made of a metal having a wear resistance.

However, as a resin injection mold body 82 around (that is, radially outside) the tubular material 80 forming the resin reservoir pot 79 is made of steel (e.g., common steel or carbon steel), a part including a downstream portion of a runner 83 from the resin reservoir pot 79 and a part for injecting a resin into a magnet insertion hole 86 through a resin injecting inlet 84 are made of steel, and thus there is a case in which an abnormal wear is produced in the resin injection mold body 82 forming the downstream portion of the runner 83 and the resin injecting inlet 84.

When an abnormal wear is produced in the downstream portion of the runner 83 or the resin injecting inlet 84, there is a problem that a resin is attached to the worn portion and cured to inhibit a flow of a molten resin, and the resin cannot be injected into the magnet insertion hole 86. Further, there is a problem that mold releasing property is reduced as the attached resin becomes a resistance, and the resin in the runner 83 is broken or a part or all of the resin remains in the mold when releasing the mold.

Moreover, as materials for the resin reservoir pot 79 and the resin injection mold body 82 are different from each other, the tubular material 80 and the resin injection mold body 82 are typically fixed by shrink-fitting. Accordingly, there is a problem that the tubular material 80 is sometimes displaced with respect to the resin injection mold body 82 in a height direction, a circumferential direction, or a radial direction, and when a stepped portion is produced in the runner 83, an abnormal wear is produced at this portion.

In addition, there is also a problem that as these metals have different thermal expansion rates from each other, a gap is produced between the tubular material 80 and the resin injection mold body 82 forming the resin reservoir pot 79, and a resin comes into the gap when injected, and when the resin is cured, the resin reservoir pot 79 is inclined with respect to the resin injection mold body 82, a sliding resistance between the plunger 81 and the tubular material 80 forming the resin reservoir pot 79 increases, and thus the mold apparatus may be broken. It should be noted that in FIG. 8(A), a reference numeral 88 indicates a permanent magnet, and a reference numeral 89 indicates a laminated core.

The present invention has been made in view of the above problems, and its object is to provide a method of resin-sealing for a laminated core with which wear in a resin injection mold due to injection of a resin into a magnet insertion hole is not easily produced, and a gap between a resin reservoir pot and the resin injection mold due to a difference in thermal expansion is not easily produced.

Means for Solving the Problems

A first aspect of the present invention provides a method of resin-sealing for a laminated core, the method including the steps of: holding by sandwiching a core body between a resin injection mold and a supporting mold that face each other, the core body having a plurality of magnet insertion holes in which permanent magnets are respectively inserted; extruding a molten resin using a plunger from each of resin reservoir pots provided in the resin injection mold; and resin-sealing the permanent magnets in the magnet insertion holes, wherein a material of the resin reservoir pot of the resin injection mold and a region through which the resin passes from the resin reservoir pot is a superhard material, and wear in the resin injection mold due to a flow of the resin is reduced.

A second aspect of the present invention provides the method of resin-sealing for a laminated core according to the first aspect, wherein the resin injection mold includes: a cylindrical body having the resin reservoir pot and the region through which the resin passes and made of the superhard material; and a resin injection mold body supporting the cylindrical body and made of steel.

A third aspect of the present invention provides the method of resin-sealing for a laminated core according to the second aspect, wherein injection holes are provided inside an outer periphery of the cylindrical body, the injection holes respectively communicating to the magnet insertion holes of the core body.

A fourth aspect of the present invention provides the method of resin-sealing for a laminated core according to the third aspect, wherein runners respectively connecting the injection holes and the resin reservoir pots are provided.

A fifth aspect of the present invention provides the method of resin-sealing for a laminated core according to the fourth aspect, wherein connecting portions between the resin reservoir pots and the runners are chamfered in a circular arc cross-section shape.

A sixth aspect of the present invention provides the method of resin-sealing for a laminated core according to the fourth and fifth aspects, wherein the runners are provided on the cylindrical body, and tapered such that a section of the runners decreases from an opening side toward a bottom.

A seventh aspect of the present invention provides the method of resin-sealing for a laminated core according to the fourth and fifth aspects, wherein the runners are provided on a middle plate disposed between the resin injection mold and the core body.

An eighth aspect of the present invention provides the method of resin-sealing for a laminated core according to the seventh aspect, wherein the runners are tapered such that a section of the runners increases toward the resin injection mold.

Effects of the Invention

In the method of resin-sealing for a laminated core according to the first to the eighth aspects of the present invention, as the material of the resin reservoir pot of the resin injection mold and the region through which the resin passes from the resin reservoir pot is the superhard material, wear in the resin injection mold due to the flowing resin is extremely reduced, and it is possible to prevent a problem that the resin is attached to the injection holes to the magnet insertion holes (the runners when the runners are provided) and cured to inhibit the flow of a molten resin and the resin cannot be injected into the magnet insertion hole.

Further, even if there is a gap between the metal constituting the resin reservoir pot and the resin injection mold body due to a difference in coefficients of thermal expansion, the resin cannot come into the gap because the gap and the resin are not in contact with each other.

In addition, it is possible to prevent mold releasing property from being reduced due to the attached resin as a resistance.

In particular, in the method of resin-sealing for a laminated core according to the second to the eighth aspects of the present invention, as the resin injection mold includes the cylindrical body having the resin reservoir pot and the region through which the resin passes and made of the superhard material, machine processing is facilitated and it is possible to perform highly accurate processing and assembly.

In the method of resin-sealing for a laminated core according to the fifth aspect of the present invention, as the connecting portions between the resin reservoir pots and the runners are chamfered in a circular arc cross-section shape, it is possible to increase strength of the cured resin at the connecting portions, and to prevent the resin from being broken when the resin injection mold is removed or attached.

In the method of resin-sealing for a laminated core according to the sixth aspect of the present invention, as the section of the runners decreases from the opening side toward the bottom, the cured resin is easily removed from the runners, leaving no resin within the runners.

In the method of resin-sealing for a laminated core according to the seventh aspect of the present invention, as the runners are provided on the middle plate disposed between the resin injection mold and the core body, the wear in the resin injection mold may be reduced, and it is possible to perform resin-injection for a laminated core of different of types by replacing the middle plate. Further, even if wear occurs in the middle plate, the worn portion is eliminated only by replacing the middle plate.

Finally, in the method of resin-sealing for a laminated core according to the eighth aspect of the present invention, as the runners are tapered such that the section of the runners increases toward the resin injection mold, the resin may be easily removed from the middle plate.

MODE FOR CARRYING OUT THE INVENTION

Figure 1:
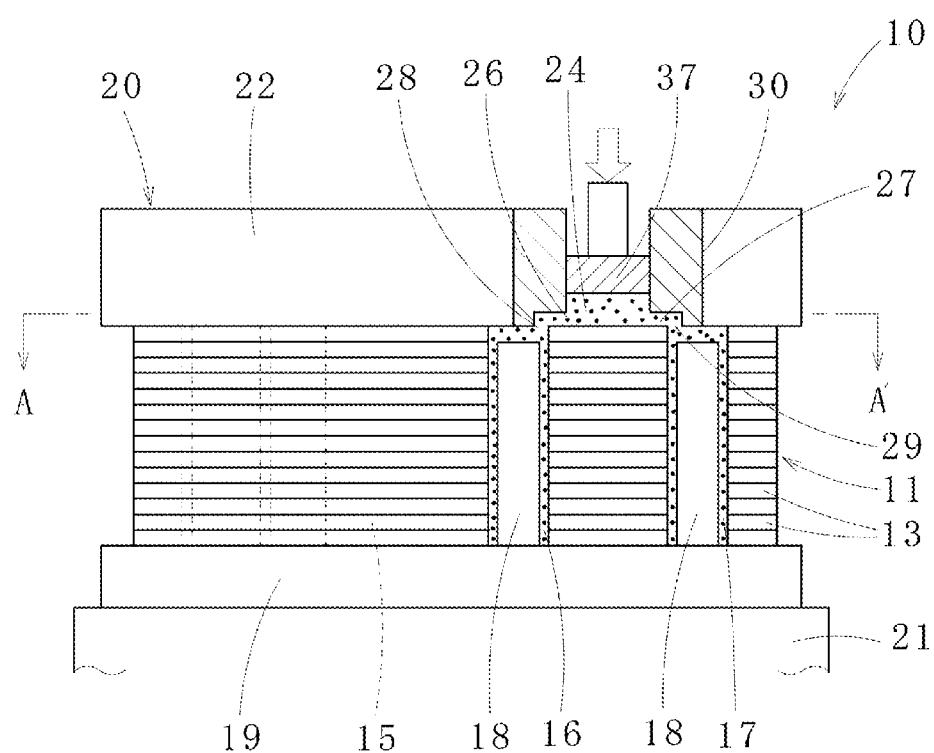
FIG. 1 is a partial sectional view illustrating a method of resin-sealing for a laminated core according to a first embodiment of the present invention.

Hereinafter, specific embodiments of the present invention will be described with reference to the appended drawings.

First, a method of resin-sealing for a laminated core according to a first embodiment of the present invention will be described with reference to FIG. 1 to FIGS. 3(A) and 3(B).

A core body 11 to which resin-sealing is configured such that a plurality of pressed core sheets 13 are caulked and laminated, and includes a shaft hole 15 in the center, around which a plurality pairs of magnet insertion holes 16 and 17 are provided. Permanent magnets (including one that is not magnetized) 18 are respectively inserted into the magnet insertion holes 16 and 17. Here, a reference numeral 19 indicates a carrier tray having a positioning shaft (not depicted) in the center, the positioning shaft being inserted into the shaft hole 15.

A resin-sealing apparatus 10 that resin-seals the permanent magnets 18 inserted into the magnet insertion holes 16 and 17 of the core body 11 includes: a resin injection mold 20 (an upper die in this embodiment) that is provided fixedly; a supporting mold 21 (a lower die in this embodiment) that can be moved up and down; and a lifting device (not depicted) for the supporting mold 21, and the resin-sealing apparatus 10 is capable of holding the core body 11 disposed at a predetermined position of the supporting mold 21 with the carrier tray 19 interposed therebetween by sandwiching and pressing the core body 11 between the supporting mold 21 and the resin injection mold 20 that face each other.

Figure 2:
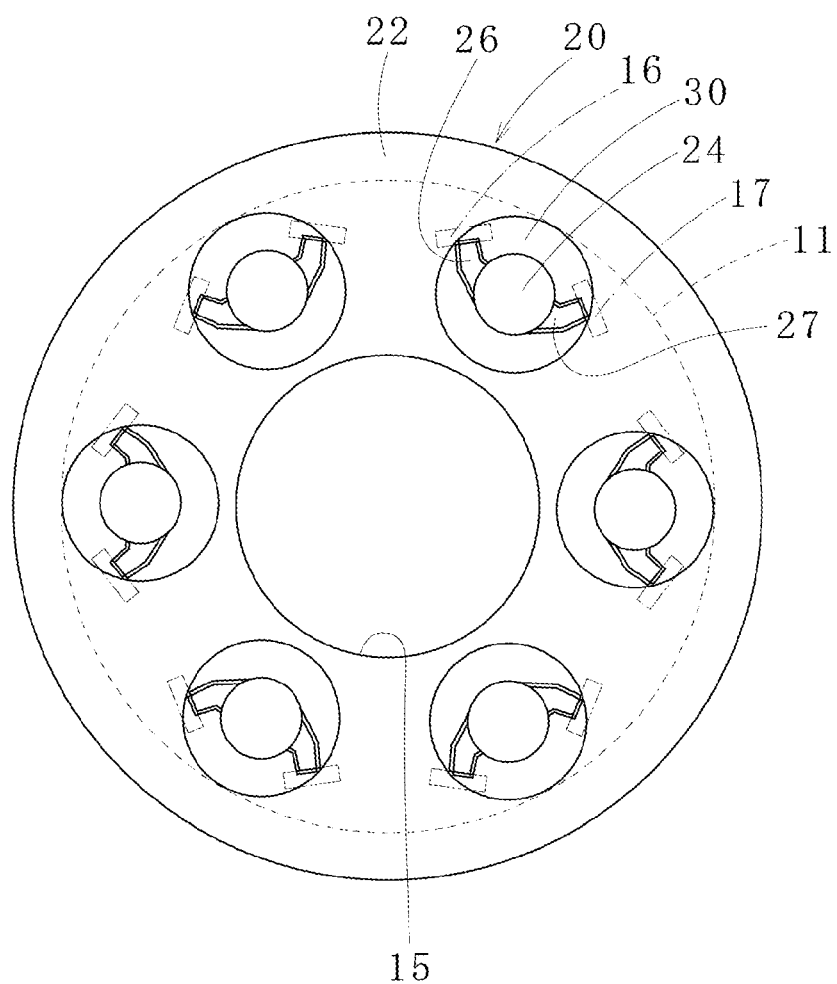
FIG. 2 is a sectional view taken by arrows A-A' in FIG. 1.
Figure 3:
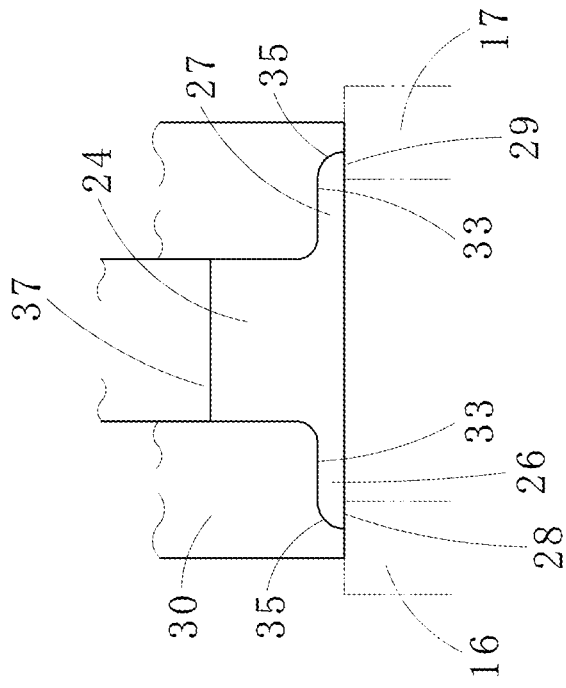
FIGS. 3(A) and 3(B) are illustrative views of the method of resin-sealing for a laminated core.
Figure 3:
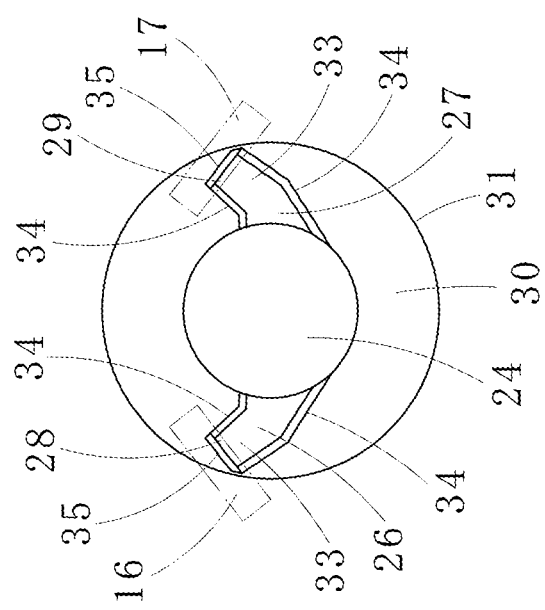

As illustrated in FIG. 2, the core body 11 is provided with the 2n (n is an integer equal to or greater than 2, and n=6 in this embodiment) magnet insertion holes 16 and 17, and the n resin reservoir pots 24 are provided in the resin injection mold 20 so as to each correspond to the magnet insertion holes 16 and 17 in a planar view (the same applies to the following embodiments). Specifically, a resin passage is configured to include runners 26 and 27 that are one example of regions through which a resin passes and extends from one resin reservoir pot 24 to a pair of the magnet insertion holes 16 and 17. In this embodiment, as illustrated in FIG. 3(A), the runners 26 and 27 on left and right are provided symmetrically with respect to the resin reservoir pot 24, and injection holes 28 and 29 for injecting a resin into the magnet insertion holes 16 and 17 are provided at terminal ends of the runners 26 and 27.

Here, the resin injection mold 20 includes: (1) a cylindrical body 30 having the resin reservoir pot 24, the continuing runners 26 and 27, and the injection holes 28 and 29, and made of tungsten carbide or an alloy similar to this as one example of a superhard material (desirably, hardness HRA 80-100, or above), (2) a resin injection mold body 22 made of common steel around the cylindrical body 30 and supporting the cylindrical body 30. Specifically, the resin reservoir pot 24 as a through-hole is provided in the center of the cylindrical body 30, and the runners 26 and 27 are provided in the bottom of the cylindrical body 30 so as not to extend from an outer circle 31 of the cylindrical body 30 (that is, with a gap from the outside). Therefore, the injection holes 28 and 29 are provided within an outer periphery of the cylindrical body 30.

As illustrated in FIGS. 3(A) and 3(B), each of the runners 26 and 27 is tapered such that its section increases in a downward direction and opens, and the section decreases from the opening side toward a bottom 33. With this, a resin coming into the runners 26 and 27 and cured may be easily removed or attached.

Further, the injection holes 28 and 29 for injecting a resin into the magnet insertion holes 16 and 17 are provided at tip ends of the runners 26 and 27, side walls of the runners 26 and 27 above the injection holes are also inclined to open toward the bottom, and a section of joint portions between the bottom 33 and its side wall 34 and a side wall 35 on the tip end side is rounded shape. Therefore, a resin coming into the injection holes 28 and 29 flows smoothly.

Then, as connecting portions between the resin reservoir pot 24 and the runners 26 and 27 are chamfered in a circular arc cross-section shape, it is possible to increase strength of the cured resin at the connecting portions, and to prevent the resin from being broken when the resin injection mold is removed or attached.

It should be noted that the resin reservoir pot 24 is provided with a plunger 37 driven by a cylinder that is not depicted, and extrudes a molten resin outside using the plunger 37. Further, known examples of a method of fixing the cylindrical body 30 and the resin injection mold body 22 include screwing, shrink-fitting, and the like. Moreover, examples of the cylindrical body 30 may include those having a flange and an attachment member at an upper part or a lower part.

Next, a method of resin-sealing for a laminated core according to a second embodiment of the present invention will be described with reference to FIG. 4, and FIGS. 5(A) and 5(B). Here, the components that are used for the method of resin-sealing for a laminated core according to the first embodiment illustrated in FIG. 1 and FIG. 2 are denoted by the same reference numerals and detailed descriptions thereof will be omitted.

Figure 4:
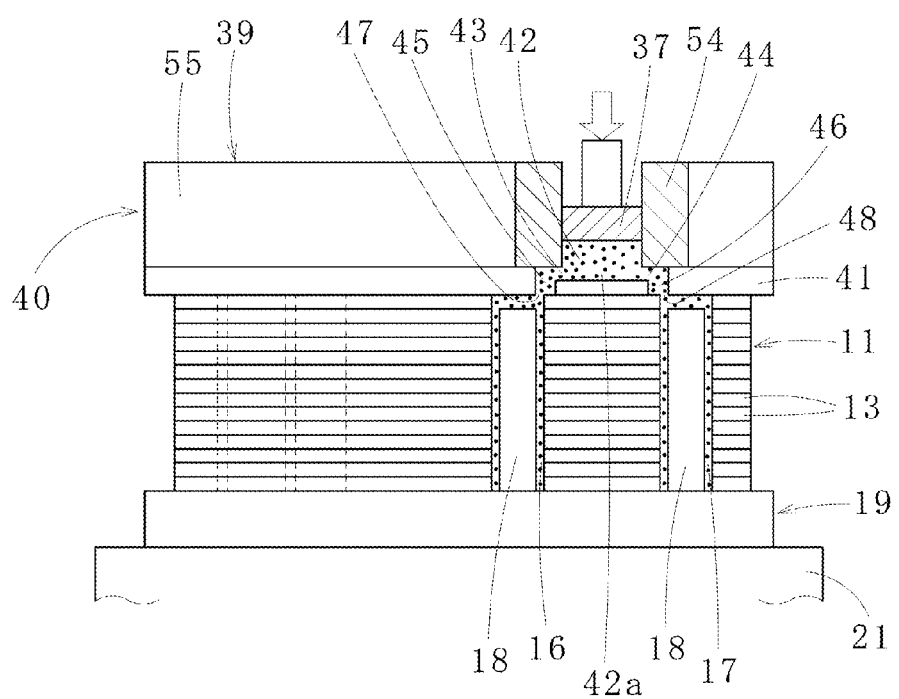
FIG. 4 is a partial sectional view illustrating a method of resin-sealing for a laminated core according to a second embodiment of the present invention.
Figure 5A:
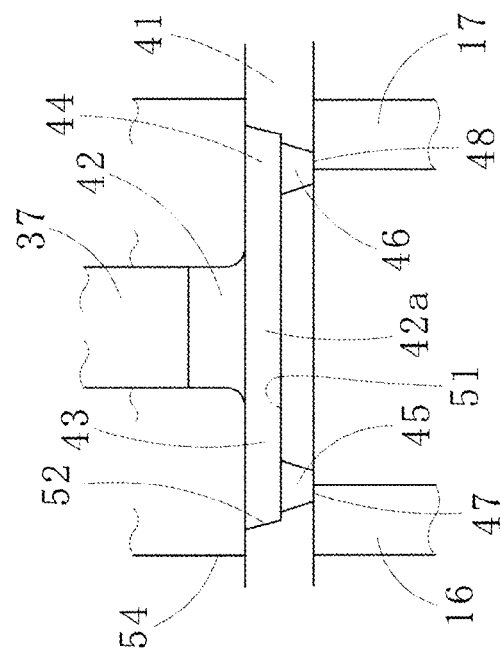
FIGS. 5(A) and 5(B) are illustrative views of the method of resin-sealing for a laminated core.
Figure 5B:
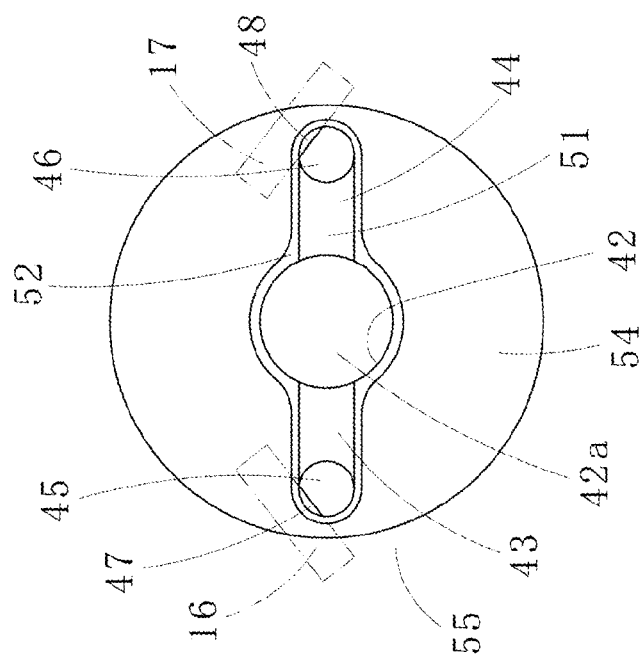

As illustrated in FIG. 4, a resin-sealing apparatus 39 employing the method of resin-sealing for a laminated core according to the second embodiment includes a resin injection mold 40 and a supporting mold 21, and a middle plate 41 (also referred to as a cull plate) is provided between the resin injection mold 40 and the core body 11.

The resin injection mold 40 is provided with a plurality of resin reservoir pots 42 each corresponding to the magnet insertion holes 16 and 17. One of the pots is illustrated in FIG. 4. The middle plate 41 is constituted by a plate made of steel, stainless steel, or superhard material, with the thickness of about 2-8 mm, for example. Above the middle plate 41 (that is, on the side of the resin injection mold 40), the plurality of resin reservoir pots 42 provided on the resin injection mold 40 are disposed, resin receiving portions 42a are respectively disposed corresponding to and immediately below the plurality of resin reservoir pots 42, and grooved runners 43 and 44 extend respectively toward the magnet insertion holes 16 and 17 from each of the resin receiving portions 42a.

At end portions of the runners 43 and 44, through-holes 45 and 46 in a circular truncated shape whose diameter decreases toward the bottom are provided, and the through-holes 45 and 46 partially lap respectively over the magnet insertion holes 16 and 17 of the core body 11 to constitute injection holes 47 and 48. Further, the runners 43 and 44 have a bottom 51 and a side wall 52, and the side wall 52 inclines (tapered) so as to spread toward the opening side, that is, upward, to allow the resin cured within the through-holes 45 and 46 and the runners 43 and 44 to be easily removed. In addition, as connecting portions from the resin reservoir pot 42 to the runners 43 and 44 are chamfered in a rounded (circular arc) cross-section shape, it is possible to increase strength of the cured resin at the connecting portions, and to prevent the resin from being broken when the resin injection mold is removed or attached.

The resin injection mold 40 includes: the resin reservoir pots 42; a cylindrical body 54 made of superhard material and including the runners 43 and 44 and the through-holes 45 and 46 provided at the end portions of the runners 43 and 44; and a resin injection mold body 55 made of steel and supporting the cylindrical body 54. Known examples of a method of fixing the cylindrical body 54 to the resin injection mold body 55 include such as a flange. With this, it is possible to prevent the resin injection mold 40 from being worn by the resin passing through the resin reservoir pot 42 and the runners 43 and 44. It should be noted that when the middle plate 41 is made of steel or made of a light alloy, the middle plate 41 may be easily replaced and considered as consumable supply even though wear occurs.

Figure 6:
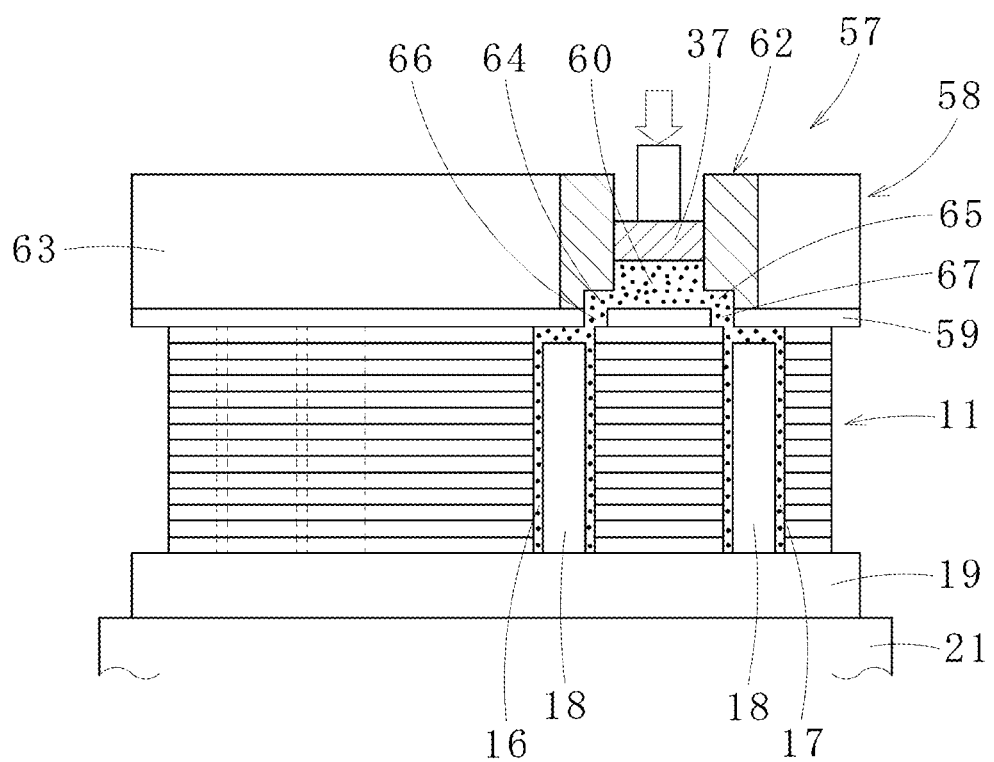
FIG. 6 is a partial sectional view illustrating a method of resin-sealing for a laminated core according to a third embodiment of the present invention.
Figure 7:
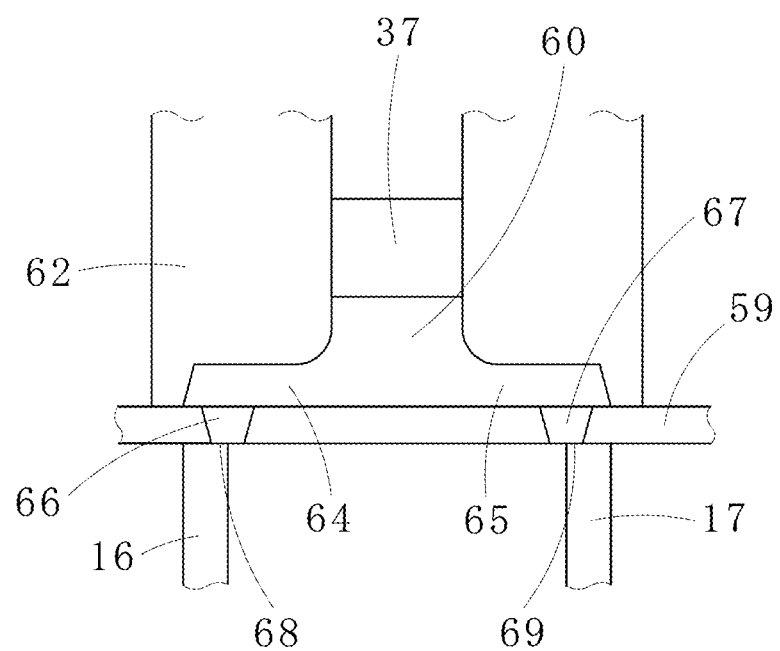
FIG. 7 is an illustrative view of the method of resin-sealing for a laminated core.
Figure 8A:
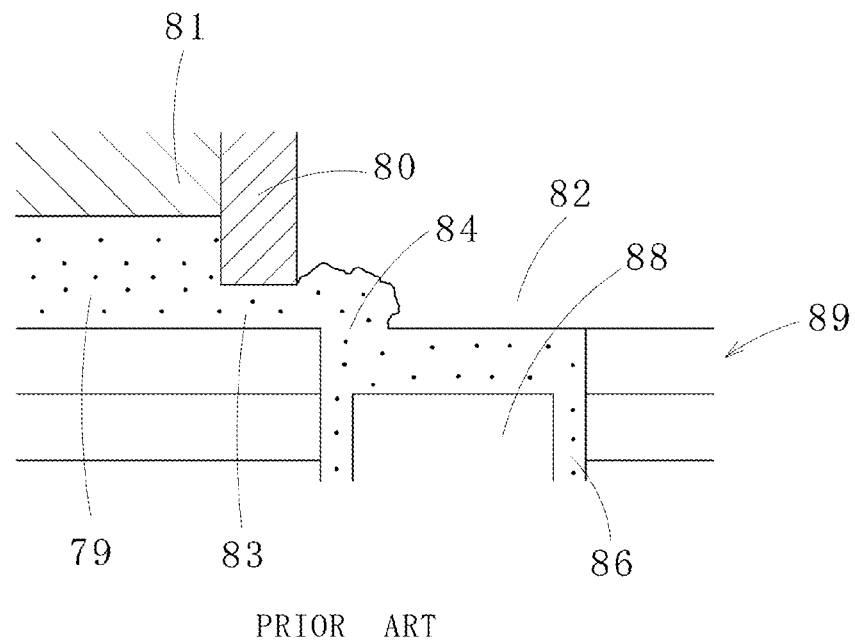
FIGS. 8(A) and 8(B) are illustrative views of a method of resin-sealing for a laminated core according to a conventional example.
Figure 8B:
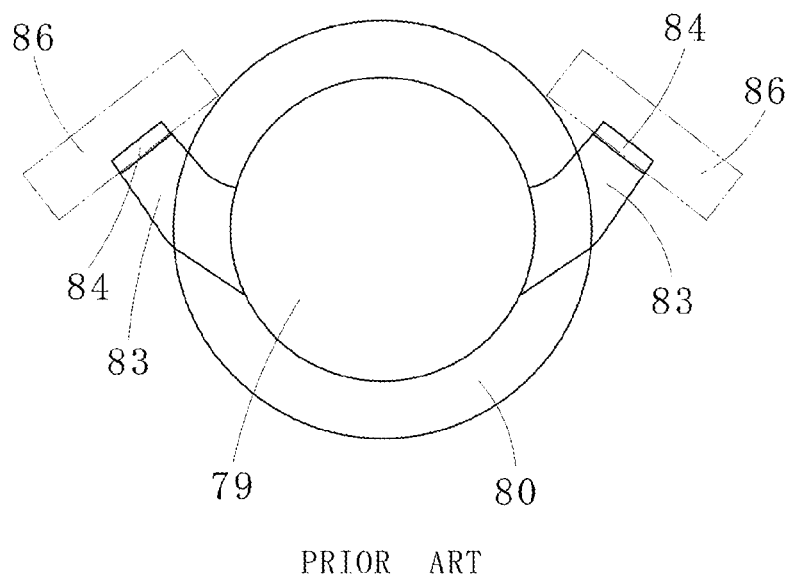

Next, a method of resin-sealing for a laminated core according to a third embodiment of the present invention will be described with reference to FIG. 6 and FIG. 7. A resin-sealing apparatus 57 employing the method of resin-sealing for a laminated core includes a supporting mold 21 and a resin injection mold 58 that sandwich and hold a core body 11 placed on a carrier tray 19, and a middle plate 59 disposed between the core body 11 and the resin injection mold 58. In this embodiment, the resin injection mold 58 is provided fixedly, and the supporting mold 21 can be moved up and down by a lifting device.

Similarly to the above-described embodiments, the core body 11 includes a plurality of magnet insertion holes 16 and 17 that are provided in pairs in a region radially outside and in a circumferential direction, and permanent magnets 18 are respectively inserted into the magnet insertion holes 16 and 17 (see FIG. 2).

The resin injection mold 58 includes cylindrical bodies 62 made of a superhard material respectively having resin reservoir pots 60 in the center, and a resin injection mold body 63 that fixedly supports the cylindrical bodies 62 and made of steel.

Runners 64 and 65 whose base ends communicate to the resin reservoir pot 60 are disposed at the bottom of each cylindrical body 62, through-holes 66 and 67 of the middle plate 59 are disposed at the other ends of the runners 64 and 65, and injection holes 68 and 69 are formed by overlapping portion of outside parts in the radial direction (with respect to the core body 11) of the through-holes 66 and 67 and the magnet insertion holes 16 and 17.

The runners 64 and 65 disposed at the bottom of each cylindrical body 62 have a bottom and a side wall opening outwardly, and sections of the runners 64 and 65 are tapered decreasing toward the bottom. With this, it is possible to prevent the runners 64 and 65 from being worn by the resin passing therethrough, and the cured resin may be easily removed from the runners 64 and 65. Then, as connecting portions between the resin reservoir pot 60 and the runners 64 and 65 are chamfered in a circular arc shape, it is possible to increase strength of the cured resin at the connecting portions, and to prevent the resin from being broken when the resin injection mold is removed or attached. In addition, as the runners 64 and 65 and the through-holes 66 and 67 are separately provided, it is possible to perform resin injection to core bodies of different sizes only by changing positions of the through-holes 66 and 67 of the middle plate 59.

The present invention is not limited to the above-described embodiments, and its configuration may be altered within a scope of the present invention. For example, in the above embodiments, the resin injection mold is provided as an upper die and the supporting mold is provided as a lower die. However, the present invention is also applied to a case in which the resin injection mold is used as the lower die and the receiving mold is used as the upper die. Further, in the above embodiments, a pair of magnet insertion holes that constitute a single magnetic pole are provided, but the present invention is also applied to a case in which the number of the magnet insertion holes may be one or more than two.

DESCRIPTION OF REFERENCE NUMERALS AND SIGNS

10: Resin-Sealing Apparatus
11: Core Body
13: Core Sheet
15: Shaft Hole
16, 17: Magnet Insertion Holes
18: Permanent Magnet
19: Carrier Tray
20: Resin Injection Mold
21: Supporting Mold
22: Resin Injection Mold Body
24: Resin Reservoir Pot
26, 27: Runners
28, 29: Injection Holes
30: Cylindrical Body
31: Outer Circle
33: Bottom
34, 35: Side Walls
37: Plunger
39: Resin-Sealing Apparatus
40: Resin Injection Mold
41: Middle Plate
42: Resin Reservoir Pot
42a: Resin Receiving Portion
43, 44: Runners
45, 46: Through-holes
47, 48: Injection Holes
51: Bottom
52: Side Wall
54: Cylindrical Body
55: Resin Injection Mold Body
57: Resin-Sealing Apparatus
58: Resin Injection Mold
59: Middle Plate
60: Resin Reservoir Pot
62: Cylindrical Body
63: Resin Injection Mold Body
64, 65: Runners
66, 67: Through-holes
68, 69: Injection Holes

The invention claimed is:

1. A method of resin-sealing for a laminated core, the method comprising the steps of:
holding by sandwiching a core body between a resin injection mold and a supporting mold that face each other, the core body having a plurality of magnet insertion holes in which permanent magnets are respectively inserted;
extruding a molten resin using a plunger from each of resin reservoir pots provided in the resin injection mold; and
resin-sealing the permanent magnets in the magnet insertion holes,
wherein a material of the resin reservoir pot of the resin injection mold and a region through which the resin passes from the resin reservoir pot is a superhard material, and wear in the resin injection mold due to a flow of the resin is reduced,
wherein the superhard material has a hardness HRA 80-100, or above,
wherein the resin injection mold includes a cylindrical body having the resin reservoir pot and the region through which the resin passes and made of the superhard material; and a resin injection mold body supporting the cylindrical body and made of steel,
wherein injection holes are provided inside an outer periphery of the cylindrical body, the injection holes respectively communicating to the magnet insertion holes of the core body,
wherein runners respectively connecting the injection holes and the resin reservoir pots are provided, and
wherein the runners are provided in the bottom of the cylindrical body.

2. The method of resin-sealing for a laminated core according to claim 1, wherein
connecting portions between the resin reservoir pots and the runners are chamfered in a circular arc cross-section shape.

3. The method of resin-sealing for a laminated core according to claim 1, wherein the runners are provided on the cylindrical body, and tapered such that a section of the runners decreases from an opening side toward at the bottom of the cylindrical body.

4. The method of resin-sealing for a laminated core according to claim 1, wherein the runners are provided on a middle plate disposed between the resin injection mold and the core body.

5. The method of resin-sealing for a laminated core according to claim 4, wherein
the runners are tapered such that a section of the runners increases toward the resin injection mold.

\* \* \* \* \*